US007593458B2

(12) United States Patent
Cioffi

(10) Patent No.: US 7,593,458 B2
(45) Date of Patent: Sep. 22, 2009

(54) FEXT DETERMINATION SYSTEM

(75) Inventor: John M. Cioffi, Atherton, CA (US)

(73) Assignee: Adaptive Spectrum and Signal Alignment, Inc., Redwood City, CA (US)

(*) Notice: Subject to any disclaimer, the term of this patent is extended or adjusted under 35 U.S.C. 154(b) by 644 days.

(21) Appl. No.: 11/122,365

(22) Filed: May 5, 2005

(65) Prior Publication Data

US 2005/0259725 A1  Nov. 24, 2005

Related U.S. Application Data

(60) Provisional application No. 60/572,051, filed on May 18, 2004.

(51) Int. Cl.
*H04B 1/00* (2006.01)
*H03K 11/00* (2006.01)

(52) U.S. Cl. .................. 375/222; 375/316; 375/295; 375/346; 375/348

(58) Field of Classification Search .......... 375/222, 375/316, 295, 346, 348
See application file for complete search history.

(56) References Cited

U.S. PATENT DOCUMENTS

| 5,479,447 | A  | * | 12/1995 | Chow et al. ............ 375/260 |
| 5,887,032 | A  | * | 3/1999  | Cioffi ..................... 375/257 |
| 6,259,746 | B1 | * | 7/2001  | Levin et al. ............ 375/295 |
| 6,377,640 | B2 | * | 4/2002  | Trans .................... 375/354 |
| 6,748,016 | B1 | * | 6/2004  | Tzannes ................. 375/227 |
| 6,870,901 | B1 | * | 3/2005  | Gudmundsson et al. ...... 379/22 |
| 6,885,746 | B2 | * | 4/2005  | Hausman et al. ......... 379/417 |
| 6,990,196 | B2 | * | 1/2006  | Zeng et al. ............. 379/417 |
| 6,999,583 | B2 | * | 2/2006  | Valenti et al. ........... 379/417 |
| 7,016,822 | B2 | * | 3/2006  | Bosley et al. ............. 703/2 |
| 7,035,400 | B1 | * | 4/2006  | Gaikwad et al. ......... 379/417 |
| 7,050,489 | B1 | * | 5/2006  | Sjoberg et al. .......... 375/222 |
| 7,133,441 | B1 | * | 11/2006 | Barlev et al. ............ 375/222 |

(Continued)

OTHER PUBLICATIONS

International Search Report, International Application No. PCT/IB2005/001544 (3 pgs).

(Continued)

*Primary Examiner*—Jason M. Perilla

(57) ABSTRACT

Operational data is utilized to determine the FEXT interference induced by one line into the other DSL line. FEXT interference can be calculated using the NEXT interference measured between the two lines at the upstream ends of the loops and the downstream channel transfer function of one of the loops. Because the NEXT and transfer function constitute a linear time-invariant system, as does the FEXT interference between the lines, the NEXT interference and line transfer function can be multiplied (if in linear format) or added (if in logarithmic format) to approximate the FEXT interference between the lines. The collection of data, calculations and other functions performed in these techniques may be performed by a system controller, such as a DSL optimizer. An Xlog(u,n) quantity is a decibel-magnitude representation of the insertion-loss equivalent of FEXT transfer functions and is defined as the ratio of (1) a line u's source power into a matched load of 100 Ohms when no binder is present to (2) the power at the output of the subject line when line u is excited with the same source and the binder is present. Xlin (u,n) is the linear equivalent of Xlog(u,n). The Xlog(u,n) and Xlin(u,n) quantities may be represented in specific formats that assist in their use in DSL and other systems. When defined as a line's insertion loss, Xlin (or equivalently Xlog) does not include the effect of any transmit filter.

44 Claims, 9 Drawing Sheets

U.S. PATENT DOCUMENTS

| | | | |
|---|---|---|---|
| 7,158,563 B2* | 1/2007 | Ginis et al. | 375/224 |
| 7,190,665 B2* | 3/2007 | Warke et al. | 370/201 |
| 7,274,734 B2* | 9/2007 | Tsatsanis | 375/222 |
| 7,302,379 B2* | 11/2007 | Cioffi et al. | 703/20 |
| 2002/0041565 A1* | 4/2002 | Valenti et al. | 370/201 |
| 2002/0136397 A1* | 9/2002 | Zeng et al. | 379/417 |
| 2002/0181633 A1* | 12/2002 | Trans | 375/354 |
| 2003/0086362 A1* | 5/2003 | Hasegawa et al. | 370/201 |
| 2003/0086514 A1* | 5/2003 | Ginis et al. | 375/346 |
| 2003/0112967 A1* | 6/2003 | Hausman et al. | 379/417 |
| 2003/0202459 A1* | 10/2003 | Warke et al. | 370/201 |
| 2004/0095921 A1* | 5/2004 | Kerpez | 370/351 |
| 2004/0136463 A1* | 7/2004 | Tzannes | 375/257 |
| 2004/0157566 A1* | 8/2004 | Fishman | 455/91 |
| 2005/0123027 A1* | 6/2005 | Cioffi et al. | 375/222 |
| 2005/0123028 A1* | 6/2005 | Cioffi et al. | 375/222 |
| 2005/0129218 A1* | 6/2005 | Kimble et al. | 379/325 |
| 2005/0259725 A1* | 11/2005 | Cioffi | 375/222 |
| 2006/0072722 A1* | 4/2006 | Savoor et al. | 379/93.05 |
| 2006/0098725 A1* | 5/2006 | Rhee et al. | 375/222 |
| 2006/0198430 A1* | 9/2006 | Rhee et al. | 375/222 |

OTHER PUBLICATIONS

Written Opinion of the International Searching Authority, International Application No. PCT/IB2005/001544 (5 pgs).

J. Cioffi et al., "Example Improvements of Dynamic Spectrum Management," ANSI Contribution T1E1.4/2001-089 (as provided by International Searching Authority), Feb. 19, 2001 (pp. 1-14).

W. Yu et al., "An Adaptive Multiuser Power Control Algorithm for VDSL," Globecom '01 2001 IEEE Global Telecommunications Conference; San Antonio, TX; Nov. 25, 2001 (pp. 394-398, as provided by International Searching Authority). Reference No. XP-001090284.

W. Yu et al., "Distributed Multiuser Power Control for Digital Subscriber Lines," IEEE Journal on Selected Areas in Communications; Jun. 2002 (pp. 1105-1115, as provided by International Searching Authority). Reference No. XP-001143168.

Ginis et al., "Vectored Transmission for Digital Subscriber Line Systems," IEEE Journal on Selected Areas in Communications; Jun. 2002 (pp. 1085-1104, as provided by International Searching Authority). Reference No. XP-001143167.

Ginis et al., "Vectored-DMT: A FEXT Canceling Modulation Scheme for Coordinating Users," ICC 2001; 2001 IEEE International Conference on Communications; Jun. 11-14, 2001 (pp. 305-309, as provided by International Searching Authority). Reference No. XP-010553013.

Aldana, Carlos, "Interference Estimation for Multicarrier Systems", 2005.

Zeng, Chaohuang, "Crosstalk Identification and Cancellation In DSL Systems", (Jul. 2001).

International Search Report and Written Opinion from PCT/IB2005/001544 mailed Jul. 27, 2005, 11 pgs.

Cioffi, John, et al., "Example of Improvements of Dynamic Spectrum Management", *T1E1*, (Feb. 19, 2001).

European Patent Office, "Examination Report", Application No. 05741016.9, (May 2, 2008).

Ginis, George, et al., "Vectored-DMT: a FEXT canceling modulation scheme for coordinating users", *IEEE International Conference on Communications*, New York, NY, US, vol. 1 of 10., (Jun. 11, 2001), pp. 305-309.

Yu, W, et al., "An Adaptive Multiuser Power Control Algorithm for VSDL", *IEEE Global Communications Conference*, New York, NY, vol. 1 of 6., (Nov. 25, 2001), pp. 394-398.

* cited by examiner

FEXT DETERMINATION SYSTEM

CROSS-REFERENCE TO RELATED APPLICATIONS

This application claims the benefit of priority under 35 U.S.C. § 119(e) of U.S. Provisional No. 60/572,051 filed on May 18, 2004, entitled DYNAMIC MANAGEMENT OF COMMUNICATION SYSTEM, the disclosure of which is incorporated herein by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communication systems. More specifically, this invention relates to collecting operational data from modems and/or other components in a communication system, such as a DSL system or the like, and determining FEXT interference (far-end crosstalk) between two DSL lines without requiring direct measurement of the interference. Even more specifically, at least one embodiment of this invention includes methods and apparatus for measuring NEXT interference (near-end crosstalk) between the two lines and measuring the line channel of one of the lines and thereafter using a combination of the two measurements to approximate the FEXT interference between the two lines.

2. Description of Related Art

Digital subscriber line (DSL) technologies provide potentially large bandwidth for digital communication over existing telephone subscriber lines (referred to as loops and/or the copper plant). In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

Currently, nationwide fixed swaths of frequency have been assigned for DSL systems, establishing static management rules governing spectra use based on worst-case, generally inapplicable transmission situations. Unreasonable static limits on and practices in DSL operation have frustrated efforts to improve service to users and to increase profitability and ubiquity for operators. Current static spectrum management attempts to ensure compatibility based on postulated, assumed and sometimes contrived binder situations. Associated with any such system is an implied probability of a given situation's occurrence. For example, crosstalk, which increases with wider spectrum use and thus higher data rates, dominates the achievable performance of DSL systems. Crosstalk models used in American National Standard T1.417-2003, "Spectrum Management for Loop Transmission Systems," Sep. 3, 2003, American National Standards Institute are based on 1% worst-case coupling functions, also necessarily implying a probability of occurrence. Margins, which typically are targeted for 6 dB for DSL systems, are meant to protect against certain probable or improbable changes in line conditions. There also are probabilities of certain line lengths, presence of bridged taps, impulse noise, radio noise and other impairments. All these factors have been combined to generate a set of mandated spectrum masks or an equivalent set of calculated tests (called "Method B" and appearing in Annex A of T1.417-2003) for new communication technologies in an attempt to keep the probability of incompatibility below some threshold.

Measurement of crosstalk, especially FEXT interference, allows that interference to be removed from signals sent on various DSL lines. A variety of systems, techniques and methods have been developed for measuring and removing FEXT interference.

Systems, methods and techniques that provide a simple and accurate way to determine and measure FEXT between two DSL lines, without disrupting normal operation of the DSL system, would represent a significant advancement in the art. Also, systems, methods and techniques that permit measurement of FEXT interference in a DSL system from one side of the DSL loops likewise would represent a significant advancement in the art.

BRIEF SUMMARY

Methods, apparatus, computer program products and other embodiments of the present invention utilize data that is readily available at the upstream end of a pair of DSL loops to determine the FEXT interference induced by one line into the other DSL line. In one embodiment, the FEXT interference is calculated using the NEXT interference that can be measured between the two lines at the upstream ends of the loops and the downstream channel transfer function of one of the loops. Because the NEXT and transfer function constitute a linear time-invariant system, as does the FEXT interference between the lines, the NEXT interference and line transfer function can be multiplied (if in linear format) or added (if in logarithmic format) to approximate the FEXT interference between the lines. Data to determine both the NEXT interference and a line's downstream transfer function are readily available at the upstream end of the lines. The collection of data, calculations and other functions performed in these techniques may be performed by a system controller, such as a DSL optimizer.

Other embodiments of the present invention include methods, apparatus and computer program products for providing crosstalk information to various components of a DSL or other communication system, including systems compliant with one or more DSM (Dynamic Spectrum Management) systems and/or standards. The Xlog(u,n) quantity is a decibel-magnitude representation of the insertion-loss equivalent of the FEXT transfer functions specified in one or more DSL standards and is defined as the ratio of (1) a line u's source power into a matched load of 100 Ohms when no binder is present to (2) the power at the output of the subject line when line u is excited with the same source and the binder is present. Xlin(u,n) is the linear equivalent of Xlog(u,n). Xlog(u,n) and Xlin(u,n) quantities, and quantities related thereto, may be represented in specific formats that assist in their use in DSL and other systems. In some cases, the Xlog(u,n) quantity can be used in jointly determining spectra, even when no crosstalk cancellation is used in a given system. When defined as a line's insertion loss, Xlin (or equivalently Xlog) does not include the effect of any transmit filter.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
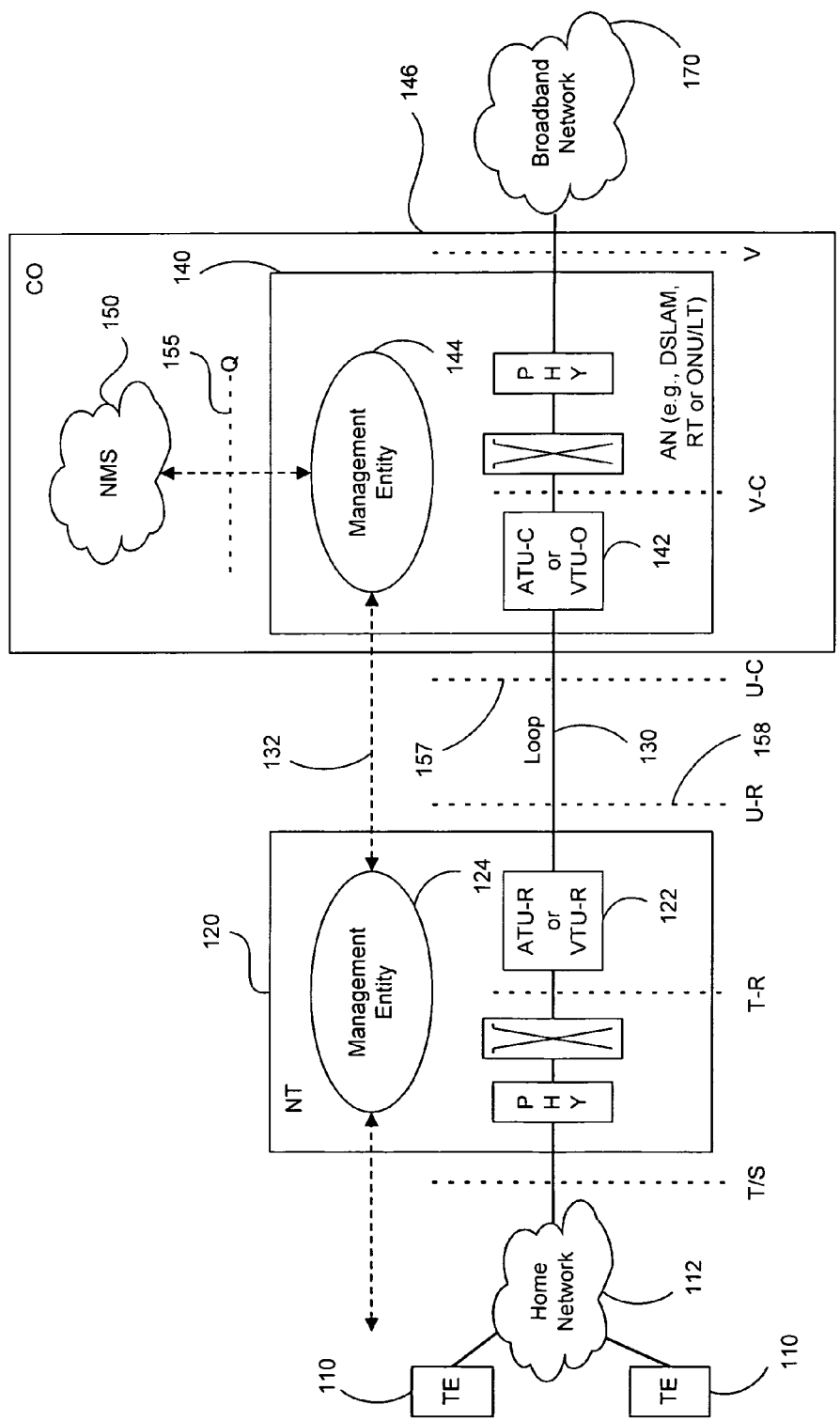
FIG. 1 is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention utilize data that is readily available at the upstream end of a pair of DSL loops to determine the FEXT interference induced by one line into the other DSL line. The FEXT interference is calculated using the NEXT interference that can be measured between the two lines at the upstream ends of the loops and the downstream channel transfer function of one of the lines. Because the NEXT and transfer function constitute a linear time-invariant system, as does the FEXT interference between the lines, the NEXT interference and line transfer function can be multiplied (if in linear format) or added (if in logarithmic format) to approximate the FEXT interference between the lines. As will be appreciated by those skilled in the art, data to determine both the NEXT interference and a line's downstream transfer function are readily available at the upstream end of the lines involved. The collection of data, calculations and other functions performed in these techniques may be performed by a system controller, such as a DSL optimizer. The controller can use the operational data and line control to enhance system operation, for example to reduce crosstalk between lines in a common binder.

In addition, embodiments of the present invention include a unique method for providing crosstalk information to various components of a DSL or other communication system, including systems compliant with one or more DSM (Dynamic Spectrum Management) systems and/or standards. Crosstalk interference relating to FEXT interference can be provided to components using either an Xlog(u,n) or Xlin(u, n) quantity (also referred to as "Xlog" and "Xlin" herein), as defined herein. Such methods and information is of use in communication systems, especially one-sided vectored DSL systems. The Xlog(u,n) quantity is a decibel-magnitude representation of the insertion-loss equivalent of the FEXT transfer functions specified in one or more DSL standards and is defined as the ratio of a line u's source power into matched load of 100 Ohms when no binder is present to the power at the output of the subject line when line u is excited with the same source and the binder is present. Xlin(u,n) is the linear equivalent of Xlog(u,n). According to some embodiments of the present invention, the Xlog(u, n) and Xlin(u,n) quantities, as well as quantities related thereto, can be represented in specific formats that assist in their use in DSL and other systems. In some cases, the Xlog(u, n) quantity can be used in jointly determining spectra, even when no crosstalk cancellation is used in a given system. As defined as an insertion loss, Xlin (or equivalently Xlog) does not include the effect of any transmit filter.

In specific embodiments of the present invention, a controller (such as a DSL optimizer and/or dynamic spectrum manager) can be used to collect operational data relating to two or more communication lines, such as a pair of DSL lines. The operational data may include such data as is normally available from a DSL or other communication systems during normal operation. Moreover, the operational data collected may include data specifically requested, prompted and/or ordered by the controller for use in connection with the present invention. The controller can use the collected operational data to analyze a given line pairing and lines' relationships to one another to determine an approximation of the FEXT interference induced between the lines. Also, the controller can perform methods according to the present invention to generate Xlog(u,n), Xlin(u,n), and other related information.

More specifically, in some embodiments of the present invention, the controller can use operational data to determine the NEXT interference induced by a first line into a second line at the lines' upstream ends. The controller also can obtain the second line's downstream transfer function, which provides downstream attenuation values for the second line. The first-to-second line NEXT and second line downstream transfer function then are combined to generate an approximation of the downstream FEXT interference induced by the first line into the second line's data signals. Other variations of the present invention will be apparent to those skilled in the art after reviewing the present disclosure.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite G.992.4, ADSL2+(G.992.5), VDSL1(G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Working Text WT-87 (Rev. 6), entitled "CPE WAN Management Protocol" from the DSL Forum, dated January 2004. Finally, DSL Forum Working Text WT-082v7, entitled "LAN-Side DSL CPE Configuration Specification" from the DSL Forum, dated Jan. 5, 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is unlikely that lines sharing the same binder terminate on the same line card or one that could coordinate the transmissions in ADSL, but it is more feasible in VDSL. However, the discussion of xDSL systems may be extended to ADSL because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
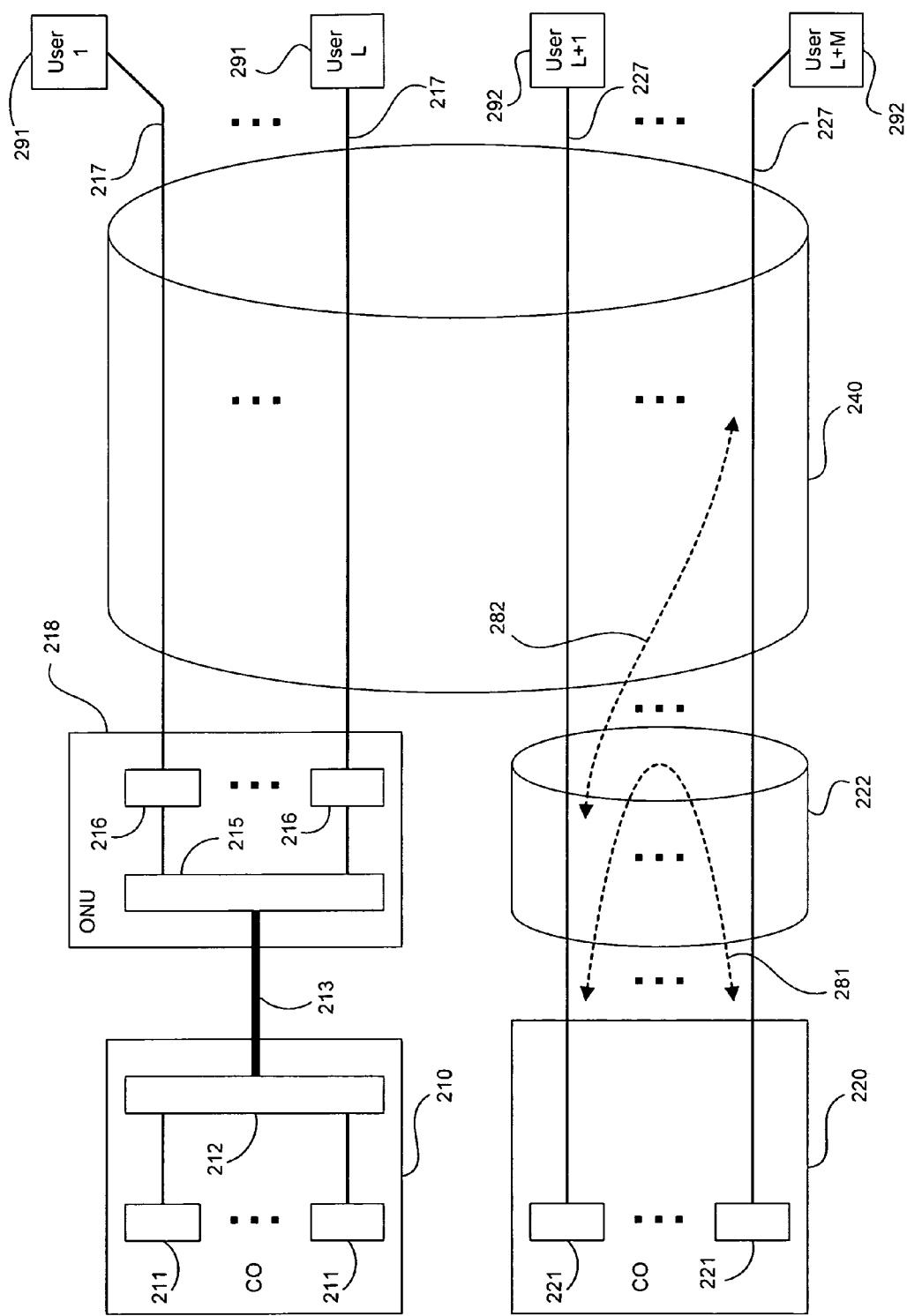
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from an ADSL NMS can be found therein; others may be known to those skilled in the art.

The following examples of embodiments of the present invention typically use ADSL systems (for example, ADSL1 and ADSL2 systems) and/or VDSL systems (for example, VDSL1 and VDSL2 systems) as exemplary communication systems. Within these DSL systems, certain conventions, rules, protocols, etc. may be used to describe operation of the exemplary DSL system and the information and/or data available from users and/or equipment on the system. However, as will be appreciated by those skilled in the art, embodiments of the present invention may be applied to various communication systems, and the invention is not limited to any particular system. The present invention can be used in any data transmission system in which determination and use of crosstalk-type interference is useful, especially where such information can be used to improve system performance.

Quantities Xlog, and Xlin typically are level-3 data DSM-compliant insertion-loss measures for multi-line one-sided vectored situations, though their compliance and use may vary. These DSM data MIB elements are both useful for several purposes in advanced (for example, level 3) vectored DSLs. Xlog is also useful in DSL systems with level 2 spectrum balancing, band preference, or OSM (Optimum Spectrum Management, also referred to as Optimum Spectrum Balancing—OSB).

Section 6.4 of the DSM Report (Draft DSM Report, ANSI Contribution T1E1.4/2003-018RA, May 24, 2004, Charlotte, N.C.) specifies level 3 DSM-data reporting compliance. The Xlin and Xlog quantities for crosstalk identification can be reported for both downstream and upstream level-3-compliant DSM systems. Xlog may also be reported and of use in Level 2 DSM. Reporting of these new quantities may have previously been thought to require coordinated training prior to the present invention. These quantities typically are most useful in single-sided vectored systems (that is, high bit rate systems that need not be bonded, so that individual lines can be different customers). Level 3 DSM compliance is intended for such single-sided vectored systems. Bonded systems need not exhibit level 3 compliance (or may have no need for doing so) and thus may not wish to claim or state level 3 DSM compliance, or in particular may not wish to supply the crosstalk information described herein.

Quantity Xlog(u,n) is analogous to the Hlog[n] of Section 6.3.1.1 in the above-referenced DSM Report. Hlog[n] also is specified in Section 8.12.3.1 of ITU ADSL2 Standard G.992.3, International Telecommunications Union, 2004, and ITU ADSL2+ Standard G.992.5, International Telecommunications Union, 2004. It also is likely to be specified for the VDSL2 standard. Xlog(u,n) applies to crosstalking channels in a communication system. Xlog(u,n) is the decibel-magnitude of the insertion-loss equivalent of the FEXT transfer in the above-referenced DSM Report Xlog(u,n) is defined as the ratio $P_s:P_o$, where:

(1) $P_s$ is line u's source power into a matched load of 100 Ohms when no binder is present; and (2) $P_o$ is the power at the output of the subject line (reporting DSM data and the line sensing the crosstalk) when line u is excited with the same source power and the binder is present.

All other lines' inputs are zeroed during this measurement and differentially terminated at both ends with 100 Ohms. If the other lines' inputs are not zeroed, then any other crosstalk is presumably subtracted. The index u is specified in terms of the degree or size of the crosstalk into the DSM-reporting line from other lines with u=1 assigned as the index of the impinging crosstalker that has largest crosstalk measured by $$\max_{i,n}\{X\log[i,n]\},$$

and u=2 being assigned the index of the impinging crosstalker that has largest crosstalk measured by $$\max_{i \neq 1, n}\{X\log[i,n]\},$$

and so forth. In general the index u is chosen so that it corresponds to $$\max_{i>u,n}\{X\log[i,n]\},$$

presuming previous indices have been identically assigned in the preceding successive stages of sorting.

Nominally, advanced modems using a capability like Xlog would be expected to know (for example, via a training procedure) the input level of the other line. However, if this level is not known, the power spectra density level (PSD) assumed for the other lines' inputs can be reported as XPSD(u).

Xlin(u,n) is analogous to the Hlin[n] specified in Section 6.3.1.1 of the referenced DSM Report and in ADSL2/2+(and likely VDSL2), but again is applied to crosstalking channels rather than the subject line itself. Xlin is the linear insertion-loss equivalent of the FEXT transfer functions specified in Table 5.1 and in Section 5.1.3.2 (see equation (35) for instance). It can be specified for use in a DSL data system in a format identical to Hlin[n], using the same ordering convention described above for Xlog[u, n] regarding the index u.

Implemented in a DSL system, the linear crosstalk insertion-loss function Xlin(u, n) and the derived logarithmic magnitude Xlog (u, n) for any line n can represent the insertion loss coupling into line n by up to U other crosstalkers, numbered u =0, 1, ..., U. These other crosstalkers need not be in the same binder and, as noted above, are ordered in terms of highest crosstalk contribution (for u=1) at any frequency from u=1, ..., U, with index u=0 reserved for the line insertion loss itself, as discussed in more detail below.

As will be appreciated by those skilled in the art, the effects of transmitter and receiver filters would not be accurately removed from the insertion loss when reported by a receiver. Indeed, in practice, it may be impossible for the receiver to remove the transmit-filter effects anyway. Thus, Xlin(0,n) is a special function that is the insertion loss of the line without any removal of transmit or receiver filters, and so differs from Hlin(n) where a "best effort" attempt is made to remove such filters that may be known well on the current line. The crosstalk insertion-loss functions should be supplied both upstream and downstream. In effect, then, the far-end crosstalk that should include the effects of only the receiver filter will be $$Xlin(u,n) = \frac{Xlin(0,n) \cdot Nlin(u,n)}{T(n)}$$

where T(n) is the known (presumably known to the transmit side) transmit filter. This transmit filter only should be removed (and not the receiver filter) because it is included in the Xlin(0,n), but is not included in the FEXT.

The linearity and cascade of transfer functions in the distributed transmission line does not include the transmit filter, which is included in Xlin(0,n). Fortunately, a reporting level 2 or level 3 device that internally knows Nlin(u,n) would then also know T(n) as both depend only on the same single-end of transmission. The ratio of NEXT to transmit-filter multiplies the reported Xlin(0,n) to obtain the desired FEXT. Equivalently, the true insertion-loss-plus-receiver-filter-only function is the ratio of Xlin(0,n) to T(n). The calculated FEXT coupling, Xlin(u,n), is useful for various types of crosstalk cancellation methods. As will be appreciated by those skilled in the art, any such linear coupling computed by a single-end would require that the Nlin(0,n) to T(n) ratio could be computed in several ways (for instance by directly measuring at the output of the transmit filter the NEXT so no ratio would be necessary), but if actually computed as a ratio would require the same sampling and DMT symbol phase for each quantity.

Xlin(u,n) can be represented in linear format by a scale(u) factor and a normalized complex number a(u,n)+j*b(u,n), where n is the subcarrier index n=0, ..., NSC (the number of carriers used) and u is an index of other users that is chosen so that u satisfies $$\max_n\{X\log(u,n)\} \geq \max_{i>u,n}\{X\log(u,n)\} \text{ for } u = 1, \ldots, U.$$

The number of crosstalkers that were identified, U, also is supplied. This may be the number of crosstalkers whose interference affecting the subject line exceeded a specified threshold value. Both a(u,n) and b(u,n) can be coded for use in various DSL system data conventions as 16-bit 2' complement signed integers. The value of Xlin(u,n) then can be defined as $$Xlin(u,n)=(\text{scale}(u)/2^{15})*(a(u,n)+j*b(u,n))/2^{15} \qquad \text{Equation (1)}$$

In order to maximize precision, the scale(u) factor should be chosen so that max (|a(u,n)|, |b(u,n)|) over all n is equal to $2^{15}-1$. Such a maximum can be guaranteed for a passive channel and the channel estimation function used.

An Xlin(u,n) value indicated as a(u,n)=b(u,n)=$(-2^{15})$ can be used as a special value. Such a value can indicate that this subcarrier is not used for data transmission (for example, that it is the DC subcarrier or the Nyquist subcarrier), or that attenuation is outside the range to be represented.

As noted above, Xlog(u,n) represents the insertion loss magnitude in decibels. In some DSL system data conventions, it can be specified as a 10-bit unsigned integer m(u,n), defined as $$Xlog(u,n)=6-m(u,n)/10 \qquad \text{Eq. (2)}$$

Xlog(u,n) can be specified during both diagnostics and initialization modes. A value of all ones can be used as a special value that indicates that the subcarrier is not used for transmission or is outside the range to be represented.

XPSD[u] can be a presumed flat PSD level used for the computation of Xlog(u,n) and Xlin(u, n) and can be specified as a 7-bit unsigned integer xpsd(u) where $$XPSD(u)=-95+0.5 \cdot xpsd(u) \qquad \text{Eq. (3)}$$

Figure 3:
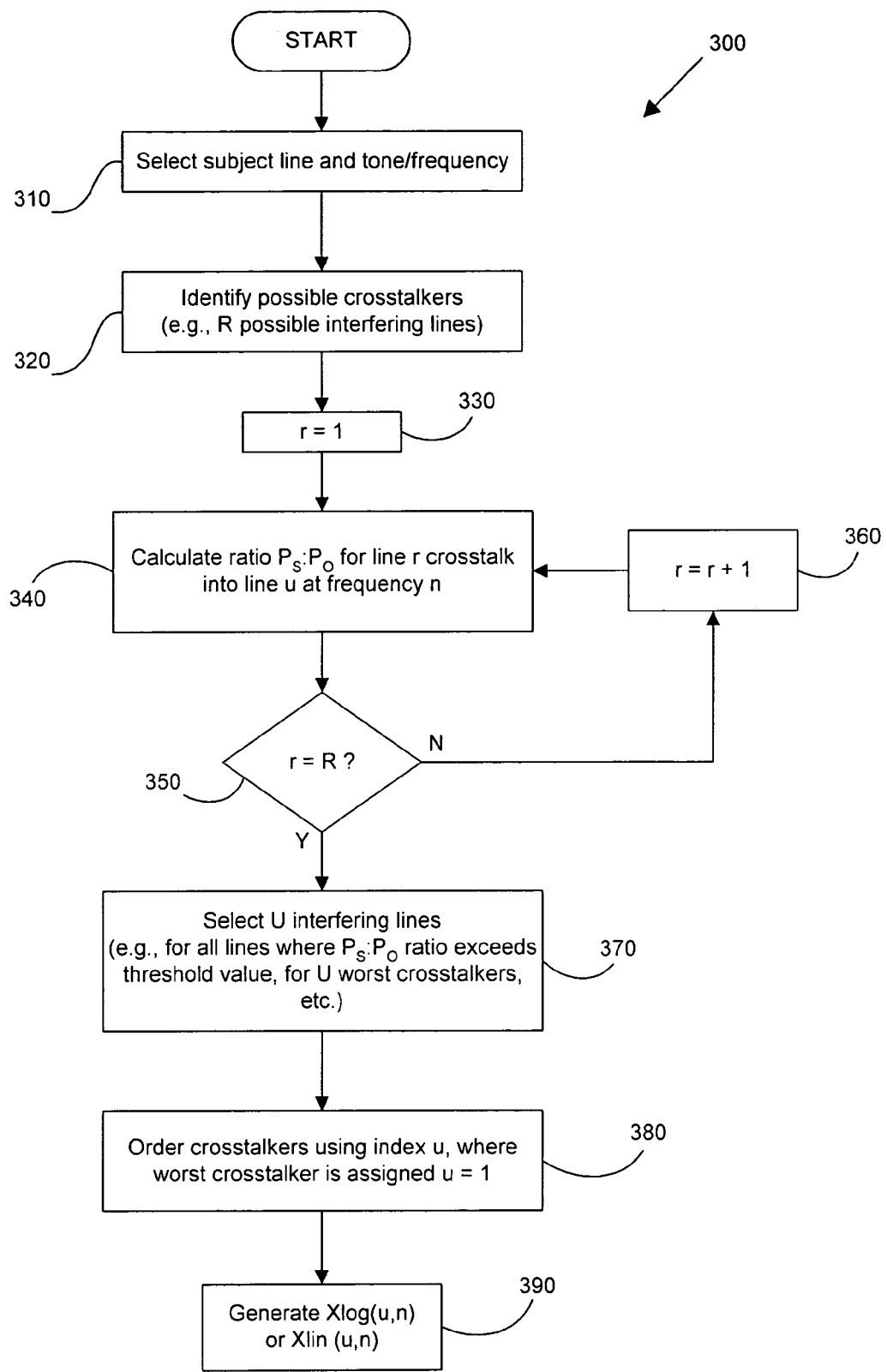
FIG. 3 is a flow diagram of a method according to one embodiment of the present invention.

A method according to one embodiment of the present invention relating to Xlog(u,n) and Xlin(u,n) is shown in FIG. 3. At 310 a subject communication line (for example, a DSL line) and tone/frequency are selected. Possible crosstalking lines are identified at 320. These typically are lines in the same binder; however, other lines may be considered as well (for example, in cases where it appears that crosstalk is being generated by lines outside a known binder configuration). In the embodiment of FIG. 3, R such potential crosstalkers are identified for evaluation. The first potential crosstalker is selected at 330. The ratio $P_s:P_o$ is calculated at 340 for each and every frequency or tone n using the methodology described above or any other that is suitable for calculation of the quantities required for this method. At decision 350 the method decides whether it has finished evaluation of all potential crosstalkers. If not, then at 360 the next potential crosstalker is brought up for consideration. Once all R of the potential crosstalkers have been evaluated and their ratios $P_s:P_o$ calculated, U of the crosstalkers can be selected at 370. The selection may be based on U of the crosstalkers having ratios that exceeded a threshold crosstalk value. Alternatively, the U worst crosstalkers can be selected. At 380 the crosstalkers are ordered according to the degree of crosstalk they induce in the subject line, for example a line reporting DSM data. The worst (most severe) crosstalker is assigned index u=1. Finally, after ordering the U crosstalkers, Xlog(u,n) and/or Xlin(u,n) can be generated at 390 and used in the DSL system (for example, by a controller such as a DSL optimizer that can assist users and operators in improving system performance).

Another embodiment of the present invention uses the fact that downstream FEXT interference, NEXT interference at the upstream end of loops and channel transfer functions are all linear time-invariant systems. As implemented in DSL systems such as ADSL2+ and VDSL2, the present invention can provide a simple way to calculate the FEXT of a pair of loops.

Figure 4:
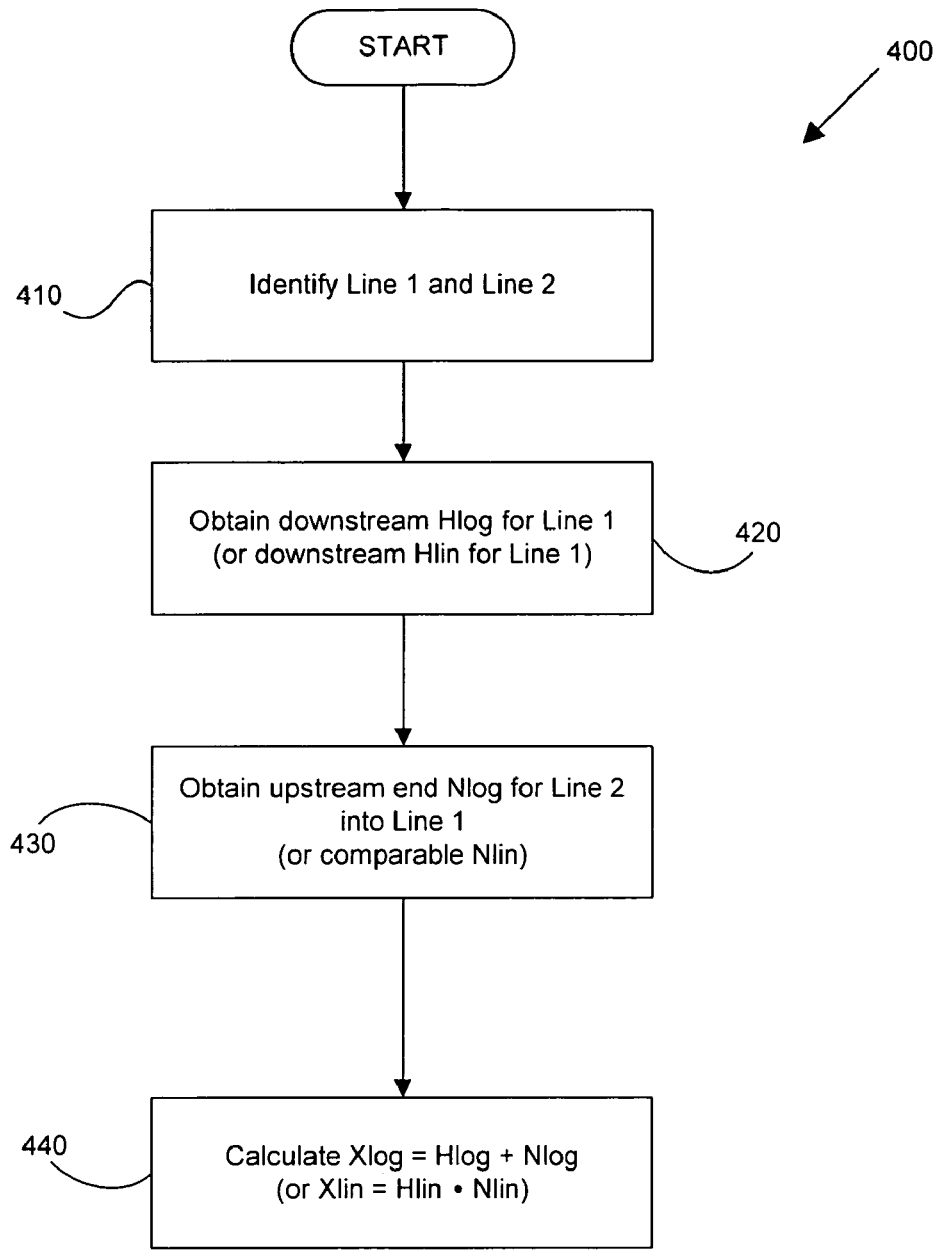
FIG. 4 is a flow diagram of another method according to one embodiment of the present invention.

FIG. 4 illustrates one method according to the present invention in which FEXT interference between two DSL lines can be determined. At 410 two lines are identified. The downstream Hlog of one line (identified as "Line 1" in FIG. 4) is obtained at 420. This may be done by collecting operational data available to the DSL system in which this line operates. Such operational data likely would be generated by the DSL system and/or MIB attempting to remove both transmit and receive filters. The receive filter would then need to be restored or included in the ultimate FEXT transfer to whatever point at which cancellation is presumed (in the case of transmitter pre-cancellation) or implemented (in terms of direct receiver crosstalk cancellation). The Hlog, per se, may be readily available as a data field or point from an MIB within the system. In other cases, the Hlog may have to be calculated from other operational data available. At 430 the upstream end Nlog from Line 2 into Line 1 is then obtained. Again, this may be accomplished in some embodiments of the present invention by collecting operational data that either provides the data field/point itself or provides other data that can be used to calculate Nlog. The operational data may include data that is generated specifically for the purpose of obtaining and/or calculating Nlog, for example by operating Lines 1 and 2 in a manner that allows Nlog to be obtained more easily.

At 440 the Hlog and Nlog values that have been obtained are added to generate an Xlog value that represents the FEXT crosstalk interference generated in a downstream direction by Line 2 into Line 1. As will be appreciated by those skilled in the art, the upstream and downstream orientations and data of the Hlog and Nlog values can be changed to obtain an upstream Xlog value, assuming that the appropriate operational data is available or can be compelled within the DSL system. As noted parenthetically in FIG. 4, linear values may be used instead of logarithmic values. In such a case, the Hlin and Nlin values obtained at 420, 430 are then multiplied at 440 to obtain Xlin. The fact that each DSL line and the crosstalk interference between such lines are all linear time-invariant systems makes the use of Hlog/Nlog and/or Hlin/Nlin combinations valid approximations for the Xlog/Xlin interference values, respectively. In linear time-invariant systems, as is well known in the art, different paths between two points will yield the same attenuation values in such a case. The paths can be seen graphically in FIGS. 5B-5D, where FEXT, NEXT, and Hlog/Hlin are illustrated as examples.

As will be appreciated by those skilled in the art, where two lines' downstream ends are close enough for NEXT to arise, the present invention can be applied to find an upstream Hlog value and a downstream-end NEXT value between two lines to determine the upstream FEXT of one line into the other. While many communication lines, such as DSL lines, are sufficiently separated to avoid downstream end NEXT, the present invention nevertheless can be applied in situations where special topologies make it applicable. Moreover, the same techniques can be applied to determine $\Delta X$ (either $\Delta Xlog$ or $\Delta Xlin$), which arises in cases where phantom-mode signals are employed. In the case of $\Delta Xlog$, an analogous methodology is employed. Hlog is calculated, obtained and/or determined in the same fashion. Instead of the NEXT function Nlog, $\Delta Nlog$ is calculated, obtained and/or determined and added to Hlog to arrive at $\Delta Xlog$. The same adaptation to linear quantities is used when finding $\Delta Xlin$ rather than $\Delta Xlog$.

The NEXT and Hlin values can be obtained in a variety of ways, as will be appreciated by those skilled in the art. In one embodiment of the present invention, these values are obtained by measuring after exciting the respective channels with a known input sequence of symbols, say TRAIN(n,k), where k is a time-symbol index, and then observing several corresponding channel outputs OUT(n,k). In an application where the downstream FEXT from a crosstalking line u is being determined in a subject line, to get the NEXT value, the output would be measured at the upstream end of the subject line with the TRAIN excitation being applied/input at the upstream end of the $u^{th}$ line. For Hlin, the output would be measured at the downstream output end of the subject line with the TRAIN excitation at the input of that main line.

The calculations for this embodiment are $$Hlin(n) = \frac{1}{L} \cdot \sum_{k=1}^{L} \frac{\text{OUT}(n,k)}{\text{TRAIN}(n,k)} \qquad \text{Eq. (4)}$$

$$Nlin(n) = \frac{1}{L} \cdot \sum_{k=1}^{L} \frac{\text{OUT}(n,k)}{\text{TRAIN}(n,k)} \qquad \text{Eq. (5)}$$

where the OUT signal changes as described above. Logarithmic quantities are found by taking 20log of the linear quantities.

Figure 5A:
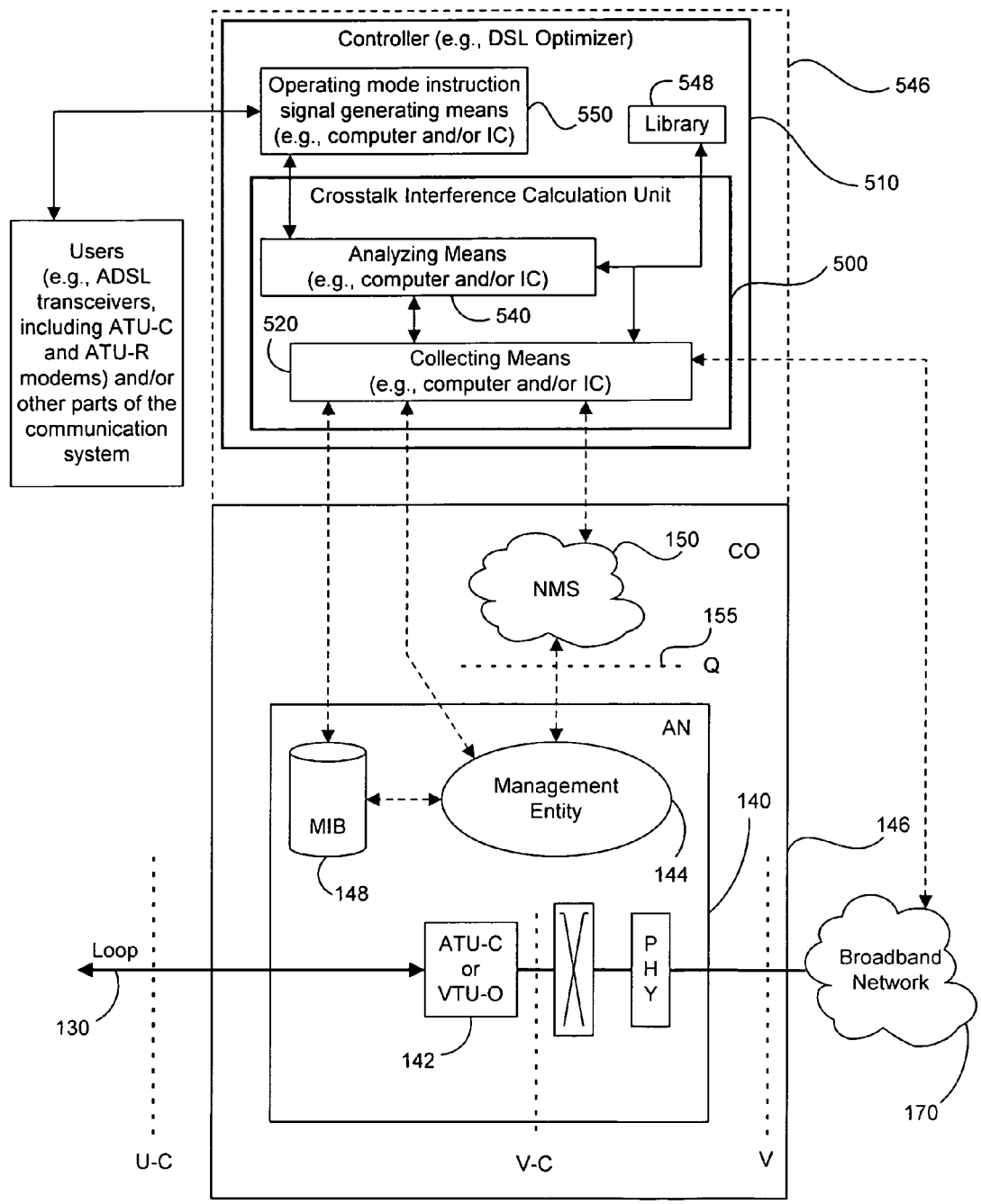
FIG. 5A is a controller including a crosstalk interference calculation unit according to one embodiment of the present invention.
Figure 5B:
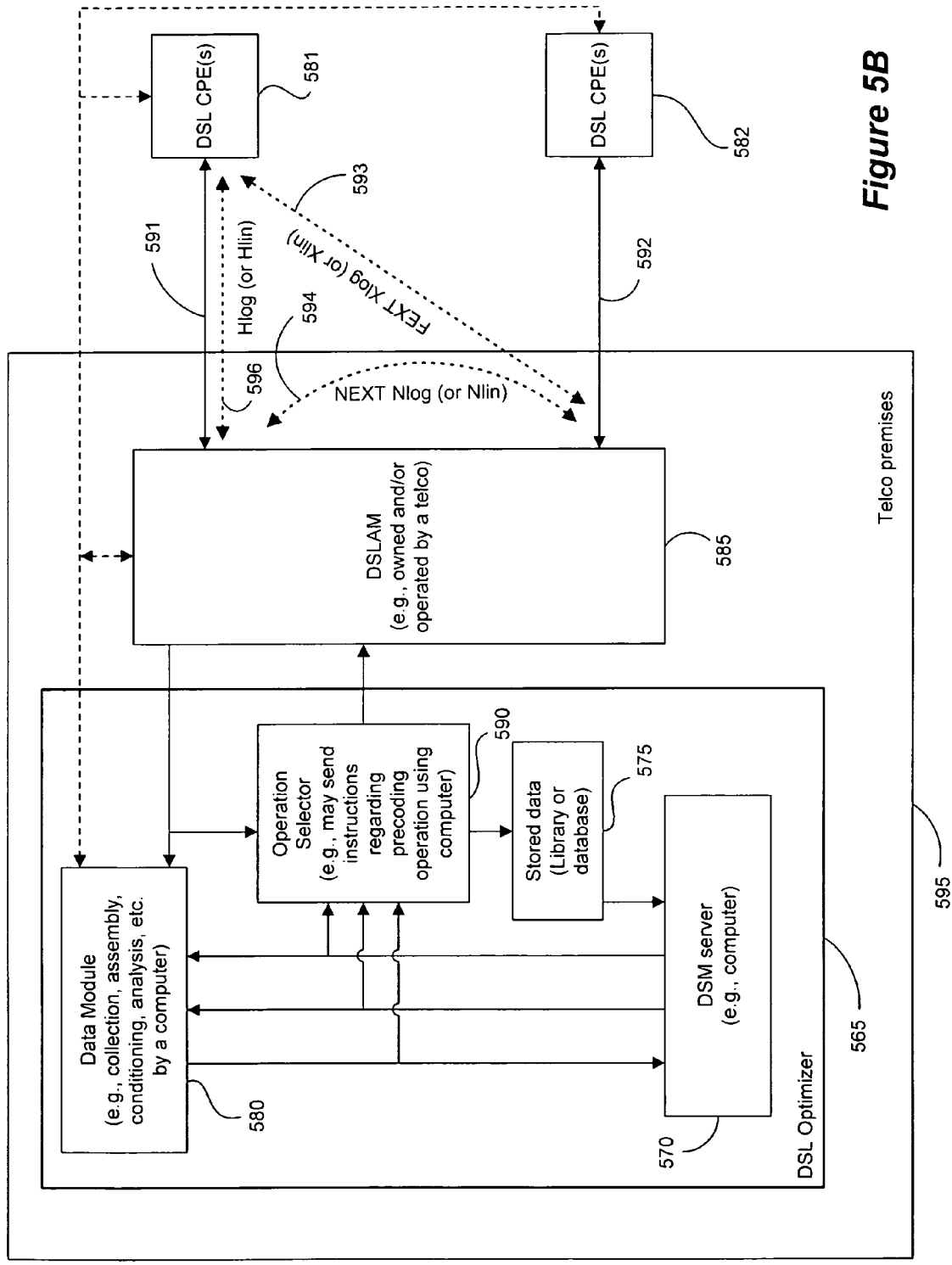
FIG. 5B is a DSL optimizer according to one embodiment of the present invention.

As discussed in more detail below, the methods according to the present invention, including the methods illustrated in FIG. 4, may be implemented in a computer program product and/or by a controller in a communication system, such as a DSL optimizer in a DSL system. The operational data may relate to measurements and/or values obtained from a DSLAM, ONU/LT device, RT device or any other suitable component in the DSL system, as shown in FIGS. 5A and 5B. Of course various types of apparatus may be used in connection with embodiments of the present invention, not merely those provided as examples in this disclosure, as will be appreciated by those skilled in the art. For example, calculations to find Xlog(u,n) and/or Xlog using the NEXT plus Hlog technique could be performed on a chip, processor, computer or other device in a local setting (that is, in or at a modem or other communication device) and then supplied to a controller such as a DSL optimizer for use in its operation. Where embodiments of the present invention are implemented in multiple devices, that apparatus operates in a manner analogous to the embodiments described in detail below where a single unit and/or apparatus at a single location performs the calculations and determinations, as will be apparent to those skilled in the art.

According to one embodiment of the present invention shown in FIG. 5A, a crosstalk interference calculation unit 500 may be part of an independent entity coupled to a DSL system, such as a controller 510 (for example, a DSL optimizer) assisting users and/or one or more system operators or providers in the system. (A controller or DSL optimizer may also be referred to as a DSM server, dynamic spectrum manager, Dynamic Spectrum Management Center, DSM Center, System Maintenance Center or SMC.) In some embodiments, the controller 510 may be an independent entity or may be an ILEC or CLEC operating a number of DSL lines from a CO or other location. As seen from the dashed line 546 in FIG. 5A, the controller 510 may be in the CO 146 or may be external and independent of CO 146 and any company operating within the system. Moreover, controller 510 may be coupled to and/or controlling DSL and/or other communication lines in multiple COs.

The crosstalk interference calculation unit 500 includes collecting means 520 and analyzing means 540. As seen in FIG. 5A, the collecting means 520 may be coupled to NMS 150, ME 144 at AN 140 and/or the MIB 148 maintained by ME 144. Data also may be collected through the broadband network 170 (for example, via the TCP/IP protocol or other protocol or means outside the normal internal data communication within a given DSL system). One or more of these connections allows the crosstalk interference calculation unit 500 to collect operational data from a communication system such as a DSL system. Data may be collected once or over time. In some cases, the collecting means 520 will collect on a periodic basis, though it also can collect data on-demand or any other non-periodic basis (for example, whenever a DSLAM or other component sends data to the compliance control unit), thus allowing the crosstalk interference calculation unit 500 to update its information, etc., if desired. Data collected by means 520 is provided to the analyzing means 540 for analysis and any calculations to determine Xlog, Xlin or any other analysis required by embodiments of the present invention.

In the exemplary system of Figure 5A, the analyzing means 540 is coupled to an operating signal generating means 550 in the controller 510. This signal generator 550 is configured to generate and send instruction signals to modems and/or other components of the communication system (for example, DSL transceivers and/or other equipment, components, etc. in the system). These instructions may include operational condition values, maximum data rate limits, upstream transmission frequency band limits, compliance instructions or other instructions regarding transmit power levels, coding and latency requirements, etc. The instructions may be generated before or after the controller 510 determines a given line's compliance with any set operational conditions in the communication system. Generator 550 also may be used to configure and order modems, etc. to operate in a manner to generate operational data needed for calculations and/or other determinations used in connection with embodiments of the present invention. For example, in calculating Xlog(u,n) for a given line, crosstalk interference calculation unit 500 and generator 550 may order certain lines to cease operation or order one or more lines to send specific data using a specified PSD or other power restriction in order to generate data that can be used to create and order the information needed for Xlog(u,n). Likewise, crosstalk interference calculation unit 500 and generator 550 may order operation that will generate and/or collect data relating to Hlog, Nlog and/or Xlog for use in connection with various embodiments of the present invention.

Embodiments of the present invention can utilize a database, library or other collection of data pertaining to the data collected, decisions made regarding relevant parameters, past calculations and determinations relating to Xlog, Xlin, etc. This collection of reference data may be stored, for example, as a library 548 in the controller 510 of FIG. 5A and used by the analyzing means 540 and/or collecting means 520.

In some embodiments of the present invention, the crosstalk interference calculation unit 500 may be implemented in a computer such as a PC, workstation or the like. The collecting means 520 and analyzing means 540 may be software modules, hardware modules or a combination of both, as will be appreciated by those skilled in the art. When working with a large numbers of modems (for example, collecting a large amount of data regarding crosstalk values), databases may be introduced and used to manage the volume of data collected.

Another embodiment of the present invention is shown in FIG. 5B. A DSL optimizer 565 operates on and/or in connection with a DSLAM 585 or other DSL system component (for example, an ONU/LT device or RT device), either or both of which may be on the telco premises 595. The DSL optimizer 565 includes a data collection module 580, which can collect, assemble, condition, manipulate and supply operational data for and to the DSL optimizer 565. Module 580 can be a computer such as a PC or the like or part of such a computer, either implemented in software, hardware or both. Data from module 580 is supplied to a DSM server 570 (for example, a data analysis module) for analysis (for example, regarding calculation of Xlog(u,n), Xlin(u,n), or Xlog/Xlin using Nlog/Nlin and Hlog/Hlin, etc.). Module 570 may be part of and/or implemented in the same computer as used for module 580 or may be a separate unit. Information may also be available from a telco database 575.

Figure 5C:
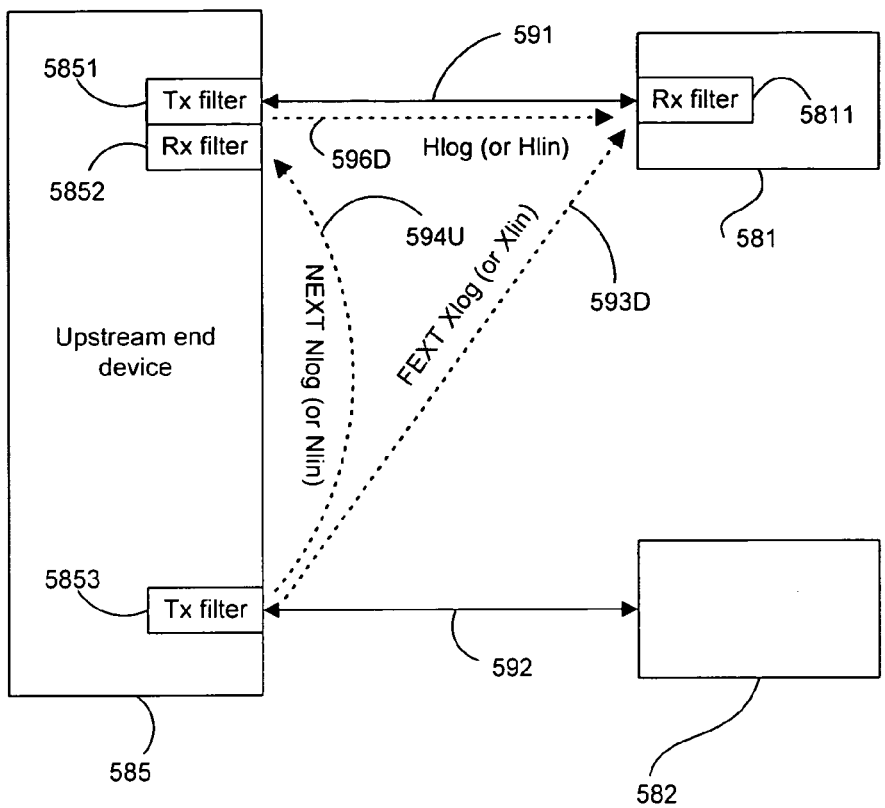
FIGS. 5C, 5D and 5E show possible crosstalk and filter effects in the system of FIG. 5B.

An operation selector 590 may be used as an instruction generator to control and/or instruct modems and the like in a given communication system (for example, to generate operational data needed for determining Xlog, Xlin, Hlog, Hlin, Nlog and/or Nlin). Selector 590 also may generate other operating mode instructions for communication system components and users pursuant to embodiments of the present invention. Instructions regarding needed operational data may be selected and sent under the control of the analysis module 570 or in any other suitable manner, as will be appreciated by those skilled in the art. Profiles and/or other operational controls from selector 590 are implemented in the DSLAM 585 and/or any other appropriate DSL system component equipment. Such equipment is coupled to DSL equipment such as customer premises equipment 581 via line 591 and customer premises equipment 582 via line 592. Crosstalk may arise such as FEXT (in upstream and/or downstream directions) and NEXT (at the upstream end and/or the downstream end). The insertion loss of line 591 arises in both upstream and downstream directions and is shown in FIG. 5B as Hlog (or Hlin) 596. The system of FIG. 5B can operate in ways analogous to the system of FIG. 5A, as will be appreciated by those skilled in the art, though differences are achievable while still using embodiments of the present invention.

Where the downstream FEXT of an offending line into a victim line is sought, some embodiments of the present invention require finding the upstream-end NEXT and the victim line's downstream insertion loss. In FIG. 5C the FEXT 593D of line 592 into line 591 is sought using an embodiment of the present invention. Again, because the relevant portions of the diagram are linear time-invariant systems, FEXT 593D can be determined using the upstream end NEXT 594U of line 592 into line 591 and the downstream insertion loss Hlog or Hlin 596D of line 591. As FIG. 5C implies, neither the transmit filter 5851 for line 591 nor the upstream-end receive filter 5852 is included in FEXT 593D. As seen in FIG. 5C, however, the transmit filter 5853 of upstream-end device 585 (for example, a DSLAM or ONU) is common to both the FEXT 593D and NEXT 594U paths and therefore is best included in the overall FEXT 593D.

As would be clear to one skilled in the art, a crosstalk cancellation system would probably use the inputs to this filter 5853 to construct an estimate of downstream FEXT for pre-subtraction on line 591, and thus it would be best to include the effects of filter 5853 in NEXT 594U if FEXT 593D were to be reported directly to a device employing FEXT cancellation that used the inputs to filter 5853. If the output of this transmit filter were instead used for crosstalk pre-estimation and pre-subtraction, then it would be best that the FEXT 593D not include the effects of transmit filter 5853.

Similarly, the receive filter 5811 of CPE 581 is common to both paths and need not be addressed in detail. It also would be best to include the effects of filter 5811 in crosstalk pre-estimation and pre-subtraction and, thus, best also to include the effects of receive filter 5811 in the FEXT 593D (which is achieved, as described above, by using $$\frac{Nlin(u, n) \cdot Xlin(0, n)}{T(n)},$$

that would include the effects of receive filter 5811 (and also transmit filter 5853, in a preferable implementation), but not the effects of transmit filter 5851, modeled by T(n) in the mathematical expression). As will be appreciated by those skilled in the art, these filter effects should be determined and removed where they affect the estimation.

Figure 5D:
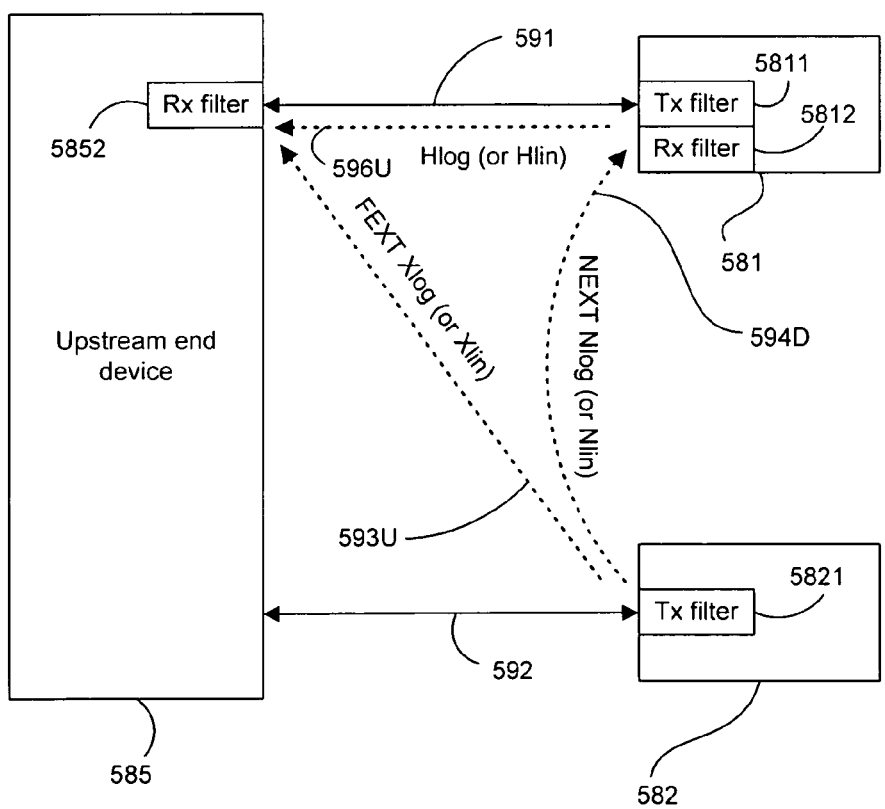
Figure 5E:
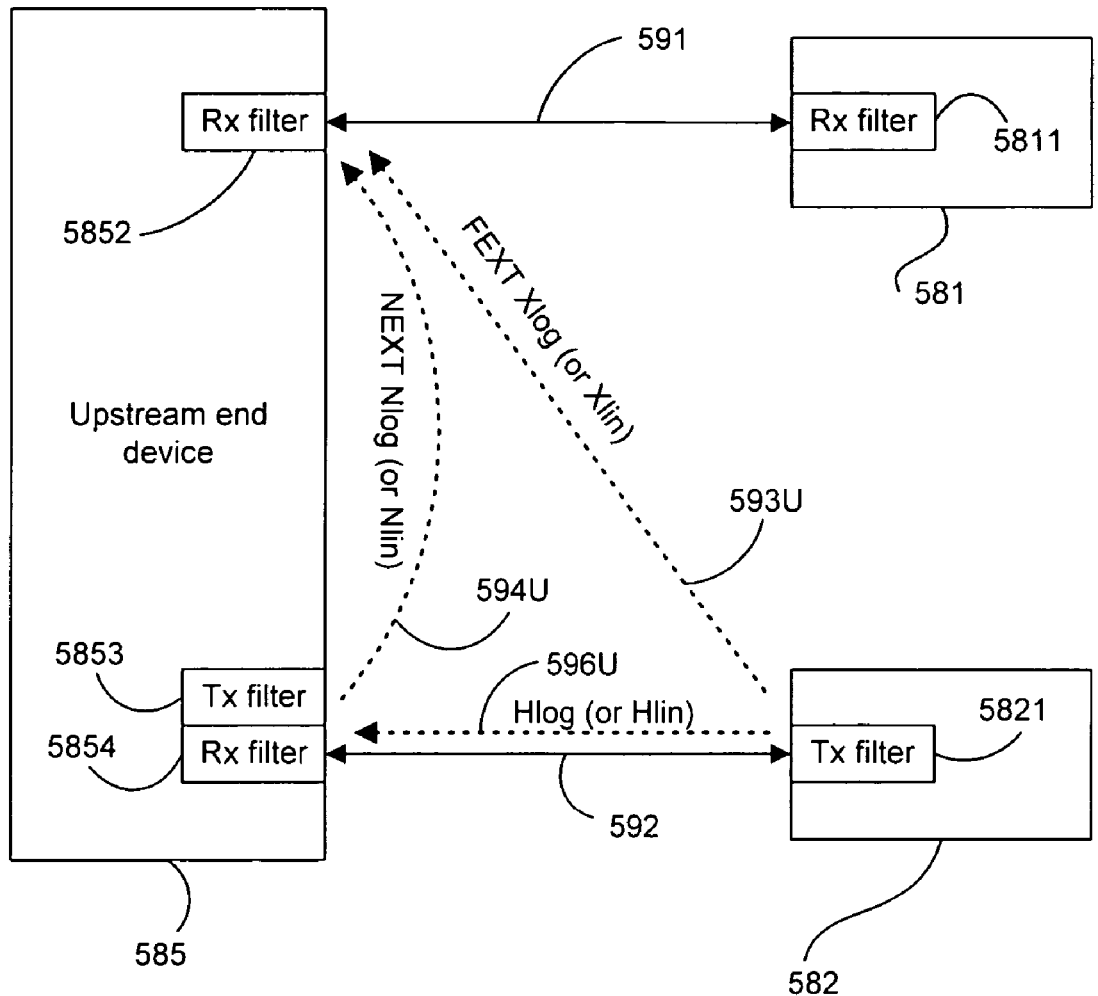

Likewise, in FIGS. 5D and 5E, where the upstream FEXT 593U is being determined, the filter effects of CPE transmit filter 5821 and upstream device filter 5852 are common to all paths. However, in FIG. 5D, the effects of the receive filter 5812 and transmit filter 5811 of CPE 581 should not be included. Likewise, in FIG. 5E, the effects of the receive filter 5854 and transmit filter 5853 of upstream-end device 585 should not be included. The system of FIG. 5E has the advantage of not requiring identification and/or calculation of the NEXT interference 594D between 2 downstream devices, such as CPEs 581, 582. The upstream end NEXT interference 594U of FIG. 5E is more easily calculated and/or determined in many situations, due to the common clock and/or other synchronization available in an upstream-end device 585.

These calculations may be affected by whether Hlog or Hlin as reported (for example, using a DSL system MIB parameter) is used or, instead, whether Xlog(0,n) or Xlin(0,n) according to the present invention is used. In the former case, Hlog and Hlin normally will not include the receive filter effects, and these effects may need to be addressed in some cases (most likely by including them). In the latter case, Xlog(0,n) and Xlin(0,n) normally include transmit filter effects and therefore those filter effects may have to be addressed (most likely by removing them). Again, those skilled in the art will recognize the filters in use, their respective effects on embodiments of the present invention, and the steps necessary to remove, reduce or accommodate those effects.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given herein.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
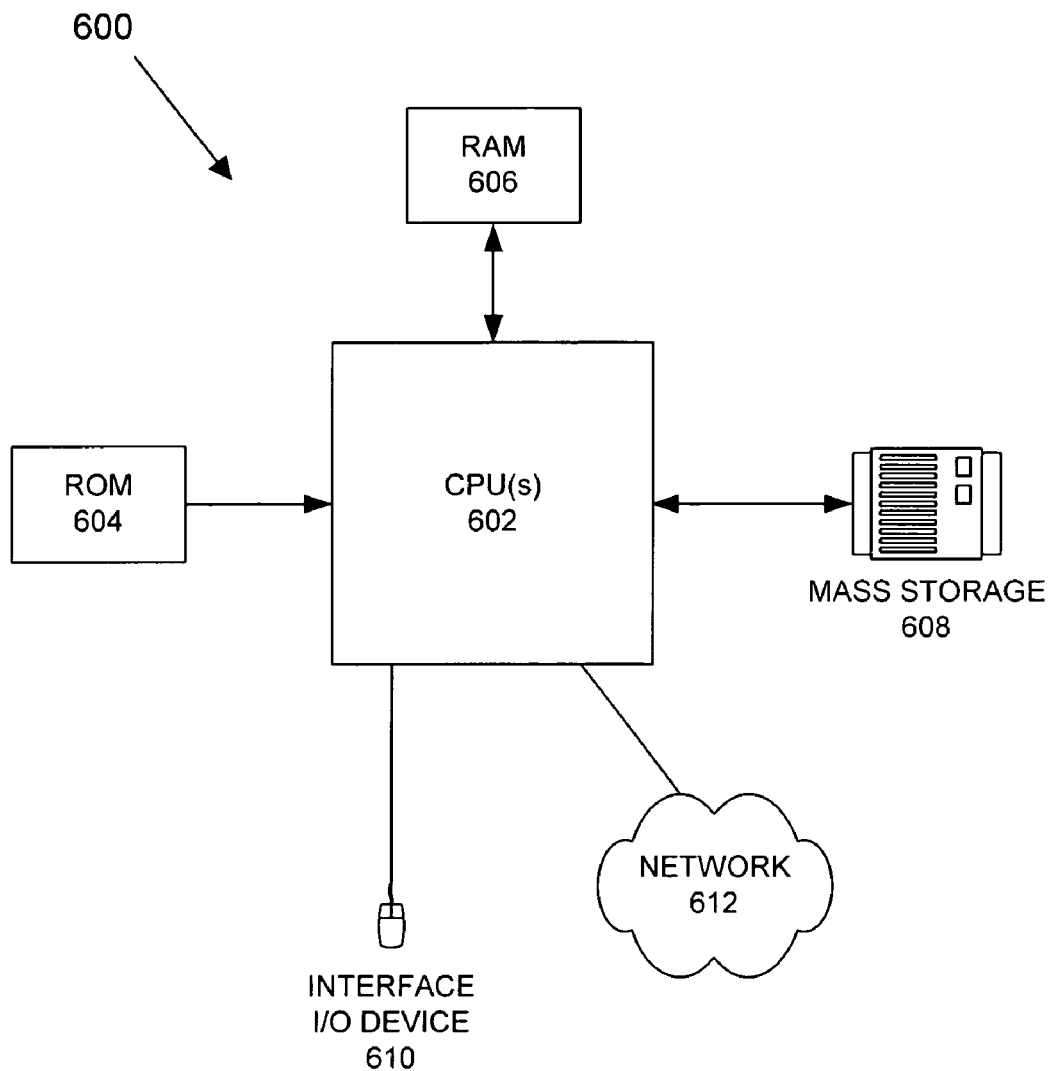
FIG. 6 is a block diagram of a typical computer system or integrated circuit system suitable for implementing embodiments of the present invention, including a computer program product that can implement one or more methods of the present invention.

FIG. 6 illustrates a typical computer system that can be used by a user and/or controller in accordance with one or more embodiments of the present invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). As is well known in the art, primary storage 604 acts to transfer data and instructions uni-directionally to the CPU and primary storage 606 is used typically to transfer data and instructions in a bi-directional manner. Both of these primary storage devices may include any suitable of the computer-readable media described above. A mass storage device 608 also is coupled bi-directionally to CPU 602 and provides additional data storage capacity and may include any of the computer-readable media described above. The mass storage device 608 may be used to store programs, data and the like and is typically a secondary storage medium such as a hard disk that is slower than primary storage. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 also is coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 608 or 614 and executed on CPU 602 in conjunction with primary memory 606. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of evaluating operational characteristics of a multi-line, vectored Digital Subscriber Line (DSL) system having a plurality of crosstalking lines in a common communication channel (channel), the method comprising:
    exciting the plurality of crosstalking lines in the channel with a known sequence of input symbols applied to the crosstalking lines;
    acquiring output data from a primary line among the plurality of lines in the channel, the output data comprising the known sequence of input symbols after having been affected by crosstalk coupling among the plurality of crosstalking lines in the channel;
    ordering the crosstalking lines based on a comparison between the known sequence of input symbols used to excite the crosstalking lines and the output data acquired from the primary line;
    generating a data quantity representative of the crosstalk coupling between the primary line and each of the crosstalking lines based on the ordering of the crosstalking lines; and
    sending instructions to one or more modems communicatively interfaced with the plurality of crosstalking lines in the channel based on the data quantity generated.

2. The method of claim 1, wherein the instructions sent to the one or more modems comprise instructions to implement: operational condition values, a maximum data rate limit, upstream transmission frequency band limits, transmit power levels, and coding/latency requirements.

3. The method of claim 1, further comprising zeroing all inputs of the crosstalking lines to eliminate other crosstalk among the plurality of lines in the channel prior to exciting the crosstalking lines.

4. The method of claim 1, wherein the output data from the primary line is collected over time on a periodic basis.

5. The method of claim 1, wherein the data quantity representative of the crosstalk coupling between the primary line and each of the crosstalking lines comprises a Dynamic Spectrum Management data (DSM-data) quantity Xlog(u,n) that is a decibel-magnitude value representative of the extent of crosstalk coupling associated with each of the crosstalking lines and the primary line within the channel.

6. The method of claim 5, wherein the DSM-data quantity Xlog(u,n) is a function of a 10-bit unsigned integer m(u,n) such that Xlog(u,n)=6−m(u,n)/10).

7. The method of claim 5, wherein the DSM-data quantity Xlog(u,n) is specified during a diagnostics mode, an initialization mode, or during both the diagnostics and the initialization mode.

8. The method of claim 5, wherein the DSM-data quantity Xlog(u,n) is a function of a 10-bit unsigned integer m(u,n) such that Xlog(u,n)=6−m(u,n)/10) and further wherein Xlog(u,n) is specified during a diagnostics mode, an initialization mode, or during both the diagnostics and the initialization mode.

9. The method of claim 1, wherein the output data further comprises far-end crosstalk (FEXT) and/or near-end crosstalk (NEXT) transfer functions between the primary line and each of the crosstalking lines; and
further wherein the data quantity representative of the crosstalk coupling between the primary line and each of the crosstalking lines comprises a Dynamic Spectrum Management data (DSM-data) quantity Xlog(u,n) that is a decibel-magnitude value of the insertion loss equivalent of the FEXT and/or NEXT transfer functions.

10. The method of claim 1, wherein the data quantity representative of the crosstalk coupling between the primary line and each of the crosstalking lines comprises a Dynamic Spectrum Management data (DSM-data) quantity Xlin(u,n) that is representative of the extent of crosstalk coupling associated with each of the crosstalking lines and the primary line within the channel.

11. The method of claim 10, wherein Xlin(u,n) is represented in a linear format by a scale factor scale(u) and a normalized complex number a(u,n)+j*b(u,n), where n is a subcarrier index n=0, . . . , NSC, wherein NSC is a number of carriers used, u is an index of a line transfer function between a one of the crosstalking lines and the primary line, and further wherein a(u,n) and b(u,n) are coded as 16-bit 2's complement signed integers, and
further wherein the value of Xlin(u,n) is defined as Xlin(u, n)=scale(u)/$2^{15}$)*(a(u,n)+j*b(u,n)/$2^{15}$.

12. The method of claim 1, wherein transmit signals on the plurality of lines are co-generated with a common clock and processor at a Digital Subscriber Line Access Multiplexer (DSLAM) end of the DSL system.

13. The method of claim 1, wherein transmit signals on the plurality of lines are co-generated with a common clock and processor at each of a Digital Subscriber Line Access Multiplexer (DSLAM) end of the DSL system and at a Customer Premises Equipment (CPE) end of the DSL system.

14. The method of claim 1, wherein the plurality of crosstalking lines are allocated to a single customer.

15. The method of claim 14, wherein generating the data quantity representative of the crosstalk coupling between the primary line and each of the crosstalking lines comprises generating a Dynamic Spectrum Management data (DSM-data) quantity Xlog(u,n) representing line transfer functions between crosstalking line u and the primary line at a subcarrier index n.

16. The method of claim 10, further comprising:
acquiring a value representative of insertion loss including any transmitter and receiver filter effects for the primary line; and
assigning the value to index u=0 of Xlin(u,n).

17. A controller communicably interfaced with a Digital Subscriber Line (DSL) system having a plurality of crosstalking lines in a common communication channel (channel), comprising:
means for exciting the plurality of crosstalking lines in the channel with a known sequence of input symbols applied to the crosstalking lines;
means for acquiring output data from a primary line among the plurality of lines in the channel, the output data comprising the known sequence of input symbols after having been affected by crosstalk coupling among the plurality of crosstalking lines in the channel;
means for ordering the plurality of crosstalking lines based on a comparison between the known sequence of input symbols used to excite the crosstalking lines and the output data acquired from the primary line;
means for generating a data quantity representative of the crosstalk coupling between the primary line and each of the crosstalking lines based on the ordering of the crosstalking lines; and
means for sending instructions to one or more modems communicatively interfaced with the plurality of crosstalking lines in the channel based on the data quantity generated.

18. The controller of claim 17, wherein the instructions sent to the one or more modems comprise instructions to implement: operational condition values, a maximum data rate limit, upstream transmission frequency band limits, transmit power levels, and coding/latency requirements.

19. The controller of claim 17, further comprising means for zeroing all inputs of the crosstalking lines to eliminate other crosstalk among the plurality of lines in the channel prior to exciting the crosstalking lines.

20. The controller of claim 17, wherein the output data from the primary line is collected over time on a periodic basis.

21. The controller of claim 17, wherein the DSL system comprises a multi-line, vectored DSL system.

22. The controller of claim 17, wherein the output data further comprises far-end crosstalk (FEXT) and/or near-end crosstalk (NEXT) transfer functions between the primary line and each of the crosstalking lines; and
further wherein the data quantity representative of the crosstalk coupling between the primary line and each of the crosstalking lines is the insertion loss equivalent of the FEXT and/or NEXT transfer functions.

23. The controller of claim 17, wherein the data quantity representative of the crosstalk coupling between the primary line and each of the crosstalking lines comprises at least one of the following:

Xlog(u,n), wherein Xlog(u,n) is a decibel-magnitude value representative of crosstalk coupling between the primary line n and each of the crosstalking lines; and Xlin(u,n), wherein Xlin(u,n) is the linear version of Xlog (u,n).

24. The controller of claim 23, wherein Xlin(u,n) is represented in a linear format by a scale factor scale(u) and a normalized complex number $a(u,n)+j*b(u,n)$, where n is a subcarrier index $n=0, \ldots, NSC$, wherein NSC is a number of used carriers, u is an index of a line transfer function between a one of the crosstalking lines and the primary line, a(u,n,) and b(u,n) are coded as 16-bit 2's complement signed integers, and further wherein the value of Xlin(u,n) is defined as Xlin$(u,n)=scale(u)/2^{15})*(a(u,n)+j*b(u,n)))/2^{15}$.

25. The controller of claim 23, wherein the quantity Xlog (u,n) is a function of a 10-bit unsigned integer m(u,n) such that $Xlog(u,n)=6-(m(u,n)/10)$.

26. The controller of claim 23, further comprising:

means for acquiring a value representative of insertion loss including any transmitter and receiver filter effects for the primary line; and means for assigning the value to index u=0 of Xlin(u,n).

27. The controller of claim 23, further comprising:

means for acquiring a value representative of insertion loss including any transmitter and receiver filter effects for the primary line; and means for assigning the value to index u=0 of Xlog(u,n).

28. The controller of claim 17, wherein the means for acquiring output data from the primary line and the means for generating the data quantities comprises the means of one or more computer systems.

29. A computer-readable medium having executable program code stored thereon that, when executed by a processor in a Digital Subscriber Line (DSL) system having a plurality of crosstalking lines in a common communication channel (channel), the executable program code causes the DSL system to perform a method comprising:

exciting the plurality of crosstalking lines in the channel with a known sequence of input symbols applied to the crosstalking lines;

acquiring output data from a primary line among the plurality of lines in the channel, the output data comprising the known sequence of input symbols after having been affected by crosstalk coupling among the plurality of crosstalking lines in the channel;

ordering the crosstalking lines based on a comparison between the known sequence of input symbols used to excite the crosstalking lines and the output data acquired from the primary line;

generating a data quantity representative of the crosstalk coupling between the primary line and each of the crosstalking lines based on the ordering of the crosstalking lines; and sending instructions to one or more modems communicatively interfaced with the plurality of crosstalking lines in the channel based on the data quantity generated.

30. The computer-readable medium of claim 29 wherein the instructions sent to the one or more modems comprise instructions to implement: operational condition values, a maximum data rate limit, upstream transmission frequency band limits, transmit power levels, and coding/latency requirements.

31. The computer-readable medium of claim 29 wherein the method further comprises zeroing all inputs of the plurality of crosstalking lines to eliminate other crosstalk among the plurality of lines in the channel prior to exciting the plurality of crosstalking lines.

32. The computer-readable medium of claim 29 wherein the output data from the primary line is collected over time on a periodic basis.

33. The computer-readable medium of claim 29 wherein the data quantity representative of crosstalk coupling between the primary line and each of the crosstalking lines within the channel comprises a Dynamic Spectrum Management data (DSM-data) quantity Xlog(u,n) that is a decibel-magnitude value representative of the extent of crosstalk coupling between the primary line and each of the crosstalking lines within the channel.

34. The computer-readable medium of claim 33, wherein the DSM-data quantity Xlog(u,n) is a function of a 10-bit unsigned integer m(u,n) such that $Xlog(u,n)=6-(m(u,n)/10)$.

35. The computer-readable medium of claim 33, wherein the DSM-data quantity Xlog(u,n) is specified during a diagnostics mode, an initialization mode, or during both the diagnostics and the initialization mode.

36. The computer-readable medium of claim 33, wherein the DSM-data quantity Xlog(u,n) is a function of a 10-bit unsigned integer m(u,n) such that $Xlog(u,n)=6-m(u,n)/10)$ and further wherein Xlog(u,n) is specified during a diagnostics mode, an initialization mode, or during both the diagnostics and the initialization mode.

37. The computer-readable medium of claim 29 wherein the output data further comprises far-end crosstalk (FEXT) and/or near-end crosstalk (NEXT) transfer functions between the primary line and each of the crosstalking lines; and further wherein the data quantity representative of the crosstalk coupling between the primary line and each of the crosstalking lines comprises a Dynamic Spectrum Management data (DSM-data) quantity Xlog(u,n) that is a decibel-magnitude value of the insertion loss equivalent of the FEXT and/or NEXT transfer functions.

38. The computer-readable medium of claim 29 wherein the data quantity representative of crosstalk coupling between the primary line and each of the crosstalking lines comprises a Dynamic Spectrum Management data (DSM-data) quantity Xlin(u,n) that is representative of the extent of crosstalk coupling between the primary line and each of the crosstalking lines and the primary line within the channel.

39. The computer-readable medium of claim 38, wherein Xlin(u,n) is represented in a linear format by a scale factor scale(u) and a normalized complex number $a(u,n)+j*b(u,n)$, where n is the subcarrier index $n=0, \ldots, NSC$, wherein NSC is a number of carriers used, u is an index of a line transfer function between a one of the crosstalking lines and the primary line, and further wherein a(u,n) and b(u,n) are coded as 16-bit 2's complement signed integers, and further wherein the value of Xlin(u,n) is defined as $Xlin(u,n)=scale(u)/2^{15})*(a(u,n,)+j*b(u,n,))/2^{15}$.

40. The computer-readable medium of claim 29 wherein transmit signals on the plurality of lines are co-generated with a common clock and processor at a Digital Subscriber Line Access Multiplexer (DSLAM) end of the DSL system.

41. The computer-readable medium of claim 29 wherein transmit signals on the plurality of lines are co-generated with a common clock and processor at each of a Digital Subscriber Line Access Multiplexer (DSLAM) end of the DSL system and at a Customer Premises Equipment (CPE) end of the DSL system.

42. The computer-readable medium of claim 29 wherein the plurality of crosstalking lines are allocated to a single customer.

43. The computer-readable medium of claim 42, wherein generating the data quantity representative of the crosstalk coupling between the primary line and each of the crosstalking lines comprises generating a Dynamic Spectrum Management data (DSM-data) quantity Xlog(u,n) for representing line transfer functions between crosstalking line u and the primary line at a subcarrier index n.

44. The computer-readable medium of claim 38, wherein the method further comprises:
acquiring a value representative of insertion loss including any transmitter and receiver filter effects for the primary line; and
assigning the value to index u=0 of Xlin(u,n).

* * * * *

UNITED STATES PATENT AND TRADEMARK OFFICE
CERTIFICATE OF CORRECTION

PATENT NO.       : 7,593,458 B2                                    Page 1 of 1
APPLICATION NO. : 11/122365
DATED            : September 22, 2009
INVENTOR(S)      : John M. Cioffi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1149 days.

Signed and Sealed this

Twenty-first Day of September, 2010

David J. Kappos
*Director of the United States Patent and Trademark Office*